United States Patent Office 3,634,448
Patented Jan. 11, 1972

3,634,448
PROCESS FOR PREPARING NAPHTH [1,2-d] IMIDAZOLE AND INTERMEDIATE THEREFOR
Kenyon Joseph Hayes, Norwich, N.Y., assignor to The Norwich Pharmacal Company
No Drawing. Filed July 31, 1969, Ser. No. 846,579
Int. Cl. C07d 49/40
U.S. Cl. 260—309.2  2 Claims

ABSTRACT OF THE DISCLOSURE

The optical brightener naphth[1,2-d]imidazole has been prepared by a process involving expensive reagents, high temperature and difficult purification of the product. An improved process consisting in reduction of 1(3)-hydroxynaphth[1,2-d]imidazole-3(1) - oxide with Raney nickel is described.

This invention is concerned with a process. More particularly, this invention deals with an improved process for preparing the optical brightener naphth[1,2-d]imidazole and a new intermediate 1(3)-hydroxynaphth[1,2-d]imidazole-3(1)-oxide useful therein.

The optical brightener naphth[1,2-d]imidazole has been described in the Bull. Inst. Chem. Res. Kyoto U. 28:75–76 (1952). Its preparation is accomplished by heating 1,2-naphthylenediamine and formic acid at high temperature yielding a crude product which is recalcitrant to usual purification methods. In addition to the high temperature and purification troubles of the known process, the amine used therein is costly.

According to the instant invention the shortcomings of the known process are substantially eliminated. A far cheaper commercially-available starting material 1-nitroso-2-naphthol is employed which in reaction with Formalin and a hydroxylammonium salt at low temperatures produces the new compound 1(3)-hydroxynaphth[1,2-d]imidazole-3(1)-oxide in good yield as an intermediate which upon reduction in the presence of Raney nickel is cleanly converted to naphth[1,2-d]imidazole readily purified, if desired, from a simple solvent such as aqueous ethanol.

In order that this invention may be readily understood by and available to those skilled in the art, the following description of it is supplied:

(A) 1(3)hydroxynaphth[1,2-d]imidazole-3(1) oxide.—
A solution of 86.7 gms. (0.5 mole) of 1-nitroso-2-naphthol, 35 gm. (0.5 mole) hydroxylamine hydrochloride 55 gm. (0.55 mole) of 30% Formalin and 8 ml. concentrated sulfuric acid in 800 ml. of methanol is heated at 40–45° for 26 hours. The dark red solution is brought to pH 5 by addition of 10 ml. of glacial acetic acid and 1000 ml. of 3% aqueous sodium hydroxide, which produces a voluminous precipitate. The purple solid is collected and washed with 100 ml. of methanol. To remove any 1,2-naphthoquinone dioxime the crude product is slurried with 500 ml. of anhydrous ethanol at 50° and filtered warm. The purple solid is dissolved in a solution of 20 gms. of caustic in 700 ml. of water, treated with 20 gms. of diatomaceous earth (Dicalite) and 15 gm. of Norit at 40° for 40 minutes. After filtration the product is precipitated by pouring the alkaline solution into dilute acetic acid. After boiling the suspension to coagulate the solid it is filtered and washed with hot water and methanol. The product is somewhat discolored. This is removed by boiling with 400 ml. of methanol and by repetition of the Dicalite-charcoal treatment of an alkaline solution. The creamy white powder is dried at 75° to yield 56.0 gm. (56%) M.P. 232° dec.

(B) Naphth[1,2-d]imidazole.—Five grams (0.025 mole) of (A) in 125 ml. of methanol with 2 teaspoons of wet Raney nickel are hydrogenated on a Parr shaker at room temperature and 45 p.s.i.g. After 18 hours, 115% of the theoretical two mole equivalents of hydrogen are absorbed. After removal of the catalyst the methanol filtrate is evaporated under the water pump. The oily residue is dried by refluxing in 100 ml. of benzene under a Dean-Stark trap. After concentration to 25 ml. it is cooled and the solid collected. The crude product is recrystallized from ethanol-water (1:2) using charcoal to give white crystals in the amount of 3.45 gms. (82% yield, M.P. 179–180°).

What is claimed is:
1. A process for preparing naphth[1,2-d]imidazole which comprises the catalytic reduction of 1(3)hydroxynaphth[1,2-d]imidazole-3(1)-oxide in the presence of Raney nickel.
2. The compound 1(3)hydroxynaphth[1,2-d]imidazole-3(1)-oxide.

References Cited
Boulton et al., J. Chem. Soc. B 1967(9), 909–14.

HENRY R. JILES, Primary Examiner

G. T. TODD, Assistant Examiner